May 26, 1936.   R. J. HICKS   2,042,396
HEADLIGHT
Filed Aug. 28, 1935
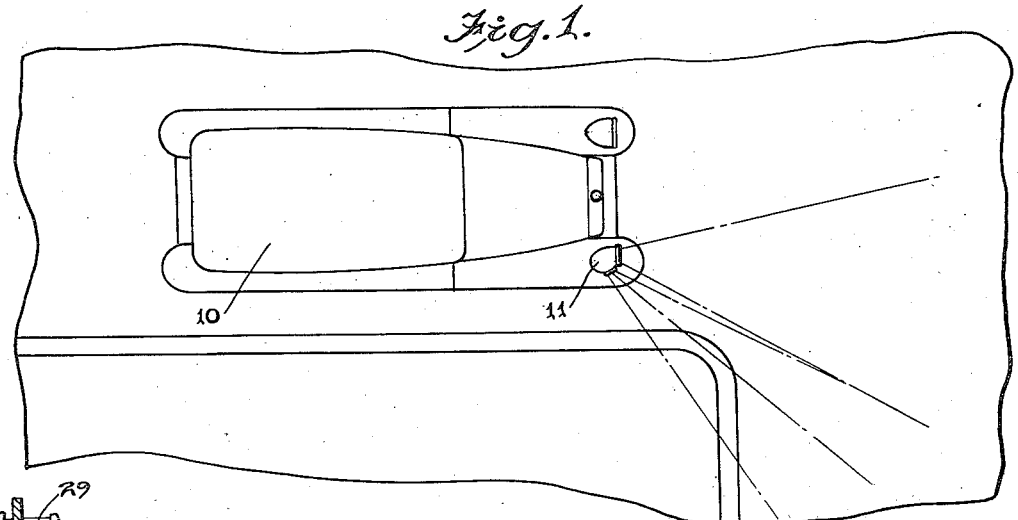
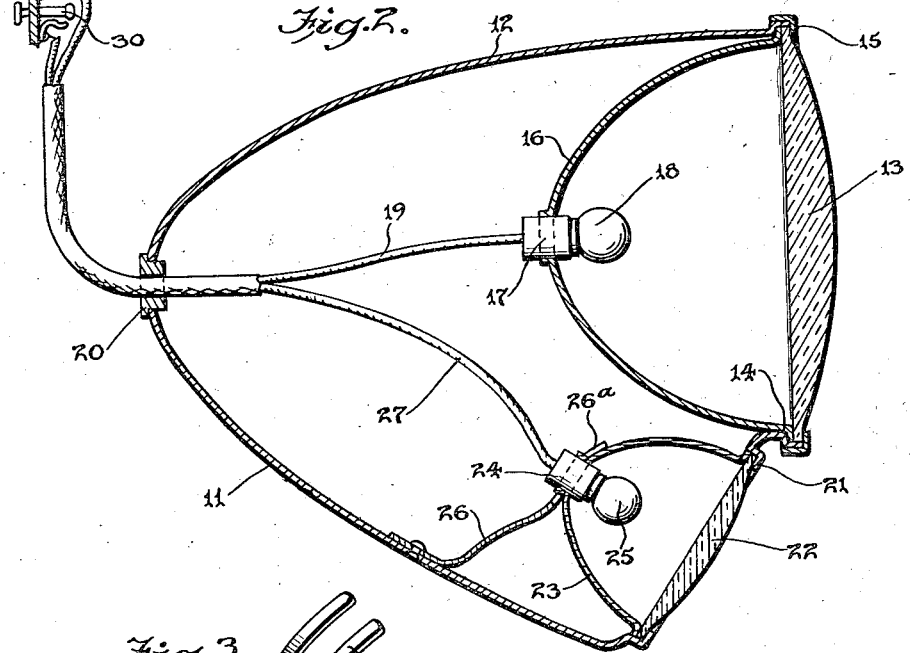
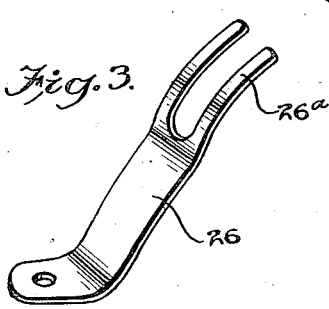
Inventor
Robert J. Hicks,
By
Attorney Patented May 26, 1936

2,042,396

UNITED STATES PATENT OFFICE 2,042,396

HEADLIGHT

Robert J. Hicks, Rochester, N. Y.

Application August 28, 1935, Serial No. 38,313

2 Claims. (Cl. 240—41.2)

My present invention relates generally to headlights for vehicles, particularly automobile headlights, and, like the headlight of my Patent 1,977,274 granted October 16, 1934, embodies two sources of light, one of which is the main straightaway light such as forms a part of all headlights and the other of which is a side curb or gutter light which may be used when necessary for this and other purposes without interfering in any way with the first mentioned light.

Furthermore as in my above mentioned patent, my present invention contemplates the inclusion of the two lights independent of one another within a single headlight casing or shell, as well as an arrangement by which the constituent parts of each light may be conveniently reached for purposes of repair and substitution as well as cleaning and general maintenance.

In the accompanying drawing which illustrates my invention and forms a part of this specification, Fig. 1 is a diagram of a street or road intersection, illustrating in connection therewith an automobile equipped with my improved lighting unit.

Fig. 2 is a horizontal sectional view taken centrally through one of the headlights of my invention, illustrating the controlling means thereof in the form of dashboard connections upon an automobile or other vehicle with which the headlight is used, and Fig. 3 is a detail plan view of the reflector holding spring of the side light.

Referring now to the above described figures and especially to Figure 1 it will be seen that the automobile or other vehicle 10 provided with my improved headlight generally indicated at 11, is shown approaching an intersection and that in addition to the usual beam thrown from the main light, a beam is shown thrown from a side light so as to fully illuminate the curb and the approach to the intersection, this side beam being such as to effectively operate not only in the precise instance illustrated but in any instance in which a side beam is effective, for instance where an automobile is driven along a closely adjacent deep gutter or a roadway having side edges in bad repair or bordering dangerous ground.

As shown in Fig. 2 my improved headlight includes a shell 12 and which may be of conical or other formation in general or otherwise formed with the pleasing streamlines incident to modern head lamps. This shell forms a casing for the entire light structure and is provided with an opening at its front for the main lens 13 which seats against a flange 14 of the shell surrounding its said opening. A clamping ring 15 externally of the lens, engages the shell in any suitable manner to hold the main lens 13 in place.

Within the shell 12 the main reflector 16 is disposed with its flanged edge clamped against the flange 14 by the lens 13. This reflector has at its apex the usual socket 17 for its light bulb 18, from which a wire 19 leads through an insulating bushing 20 at the rear or apex of the shell 12.

At one side of the above described main light support, the shell 12 has a second smaller opening surrounded by an offset flange 21 against the inner surface of which the peripheral edge of a lens 22 is seated, the latter in turn receiving the peripheral edge of the supplemental light reflector 23, it being noted from Fig. 2 in particular that the angular disposition of this supplemental light, with respect to the main light is such as to avoid any interference with or curtailment of the main beam. The supplemental reflector 23 has at its apex a socket 24 for the supplemental bulb 25 and the reflector 23 is held firmly in place and in turn holds the lens 22 firmly in place by reason of a curved spring member 26 one end of which is welded, brazed or otherwise secured to the inner surface of the shell 12 and the other cupped and slotted end 26ª of which seats against the apex of the reflector 23 so that the latter and the lens 22 are held in firmly seated relation against the flange 21 surrounding the supplemental opening of the shell 12.

The socket 24 has a wire 27 which leads rearwardly through the bushing 20 of the shell and is, like the wire 19, carried to the dash 28 of the vehicle in connection with which the lamp is employed.

Upon this dash 28 a switch 29 is arranged for the main light bulb 18 and to this switch the wire 19 is connected. A second switch 30 is also mounted upon the dash for the supplemental or side light bulb 25 and to this switch 30 the wire 27 is connected, both switches having the well known battery leads which it is not thought necessary to herein further mention.

It is obvious that with the arrangement shown, both lighting arrangements are carried in the same shell in a manner highly convenient and accessible for cleaning, general maintenance and the repair and substitution of parts and that with my invention there is provided in addition to the usual straightaway lightbeam, a supplemental beam capable of utilization at the will of the operator so as to light up and effectively disclose to the operator the curved gutter or other side feature of a roadway. The invention, properly employed, adds a high safety factor to night driving and may be readily switched on and off during the normal operation of an automobile or similar vehicle.

What is claimed is:—

1. A headlight for vehicles comprising a rearwardly tapered shell of conventional substantially conical form open at the front end and provided adjacent the front end at the outer side with a relatively small lateral opening, said shell being closed at the back, top, bottom and sides except for the small lateral opening, light reflecting means including a rearwardly tapered main front reflector of the size of the full front end of the shell and fitting the same, the taper of the main reflector providing an intervening space between the reflector and the shell at the lateral opening and an auxiliary side reflector located exteriorly of the main reflector in rear of the front edge thereof and wholly within the said intervening space at the lateral opening, light sockets axially of said reflectors, main and auxiliary lenses fitting the reflectors and supported by the same, the auxiliary lens being located at one side and in rear of the main lens and the auxiliary reflector and auxiliary lens being arranged to direct light rays downwardly, laterally and forwardly at an inclination to illuminate the area at the side and in advance of the vehicle, means located at the lateral opening and interiorly of the shell and forming a seat for the auxiliary lens to support the same and the reflector in their inclined position, and a spring mounted within the shell and having a slotted end engaging the auxiliary reflector and straddling the light socket thereof for holding the auxiliary reflector and the auxiliary lens on the said seat.

2. A headlight comprising a tapered shell open at the front end and provided with a relatively small lateral opening, a main reflector of the size of the full front end of the shell and fitting the same, an auxiliary side reflector located exteriorly of the main reflector in rear of the front edge thereof, light sockets axially of said reflectors, main and auxiliary lenses fitting the reflectors and supported by the same, the auxiliary lens being located at one side and in rear of the main lens and the auxiliary reflector and auxiliary lens being arranged to direct light rays downwardly, laterally and forwardly at an inclination to illuminate the area at the side and in advance of the vehicle, means located at the lateral opening and interiorly of the shell and forming a seat for the auxiliary lens to support the same and the reflector in their inclined position, and a spring mounted within the shell and having a slotted end engaging the auxiliary reflector and straddling the light socket thereof for holding the auxiliary reflector and the auxiliary lens on the said seat.

ROBERT J. HICKS.